(12) United States Patent
Pruthi et al.

(10) Patent No.: US 8,793,290 B1
(45) Date of Patent: Jul. 29, 2014

(54) METADATA MANAGEMENT FOR POOLS OF STORAGE DISKS

(75) Inventors: Arvind Pruthi, Los Gatos, CA (US);
Shailesh P. Parulekar, Pune (IN);
Mayur Shardul, Pune (IN)

(73) Assignee: Toshiba Corporation, Tokyo (JP)

( * ) Notice: Subject to any disclaimer, the term of this patent is extended or adjusted under 35 U.S.C. 154(b) by 273 days.

(21) Appl. No.: 13/034,483

(22) Filed: Feb. 24, 2011

Related U.S. Application Data

(60) Provisional application No. 61/307,804, filed on Feb. 24, 2010.

(51) Int. Cl.
*G06F 12/00* (2006.01)
*G06F 17/30* (2006.01)

(52) U.S. Cl.
USPC .......................................... 707/821; 711/203

(58) Field of Classification Search
None
See application file for complete search history.

(56) References Cited

U.S. PATENT DOCUMENTS

| | | | |
|---|---|---|---|
| 5,897,661 A * | 4/1999 | Baranovsky et al. | 711/170 |
| 6,216,199 B1 | 4/2001 | DeKoning et al. | |
| 6,745,207 B2 * | 6/2004 | Reuter et al. | 1/1 |
| 6,898,670 B2 * | 5/2005 | Nahum | 711/114 |
| 7,280,536 B2 * | 10/2007 | Testardi | 370/355 |
| 7,603,529 B1 | 10/2009 | MacHardy et al. | |
| 7,725,651 B2 * | 5/2010 | Saito | 711/114 |
| 8,190,850 B1 * | 5/2012 | Davenport et al. | 711/202 |
| 2002/0019908 A1 * | 2/2002 | Reuter et al. | 711/112 |
| 2004/0199515 A1 | 10/2004 | Penny et al. | |
| 2005/0071560 A1 * | 3/2005 | Bolik | 711/117 |
| 2006/0101204 A1 * | 5/2006 | Bao | 711/114 |
| 2006/0161810 A1 * | 7/2006 | Bao | 714/6 |
| 2007/0061540 A1 * | 3/2007 | Rafert et al. | 711/170 |
| 2007/0143559 A1 * | 6/2007 | Yagawa | 711/170 |
| 2007/0168634 A1 * | 7/2007 | Morishita et al. | 711/170 |
| 2008/0184000 A1 * | 7/2008 | Kawaguchi | 711/165 |
| 2009/0144501 A2 | 6/2009 | Yim et al. | |
| 2009/0150641 A1 * | 6/2009 | Flynn et al. | 711/202 |
| 2010/0023685 A1 * | 1/2010 | Ikejiri et al. | 711/114 |
| 2011/0016272 A1 * | 1/2011 | Jeong et al. | 711/114 |
| 2011/0029713 A1 * | 2/2011 | Wade et al. | 711/6 |
| 2011/0107052 A1 * | 5/2011 | Narayanasamy | 711/171 |
| 2011/0185120 A1 * | 7/2011 | Jess | 711/114 |

OTHER PUBLICATIONS

Chevance, "Server Architectures," Elsevier Digital Press, 782 pages (2005) (pp. Cover XVI, 32-35).
Authorized officer Alexandra Urlichs, International Search Report / Written Opinion in International Application No. PCT/US2010/036249, mailed Jul. 30, 2010, 13 pages.
Orb, "AIX Mirror Write Consistency with Oracle Databases", IBM/ERP Advanced Technical Support, Aug. 1999, 12 pages.

* cited by examiner

*Primary Examiner* — Robert Beausoliel, Jr.
*Assistant Examiner* — Susan F Rayyan
(74) *Attorney, Agent, or Firm* — White & Case LLP

(57) ABSTRACT

Methods, systems, and apparatus, including computer programs encoded on a computer storage medium, for managing metadata for pools of storage disks, are described. In some implementations, a system includes a processor, a memory and a storage system. The storage system contains a storage pool including multiple storage devices. Further, the storage system is configured to store in persistent storage associated with the storage pool a bitmap that is configured to indicate whether metadata blocks corresponding to one or more virtual volumes associated with the storage pool are free or occupied. In addition, the processor is configured to perform operations including accessing at least portions of the bitmap, and managing, based on information from the accessed portions, at least some of the metadata blocks stored in the persistent storage.

20 Claims, 10 Drawing Sheets

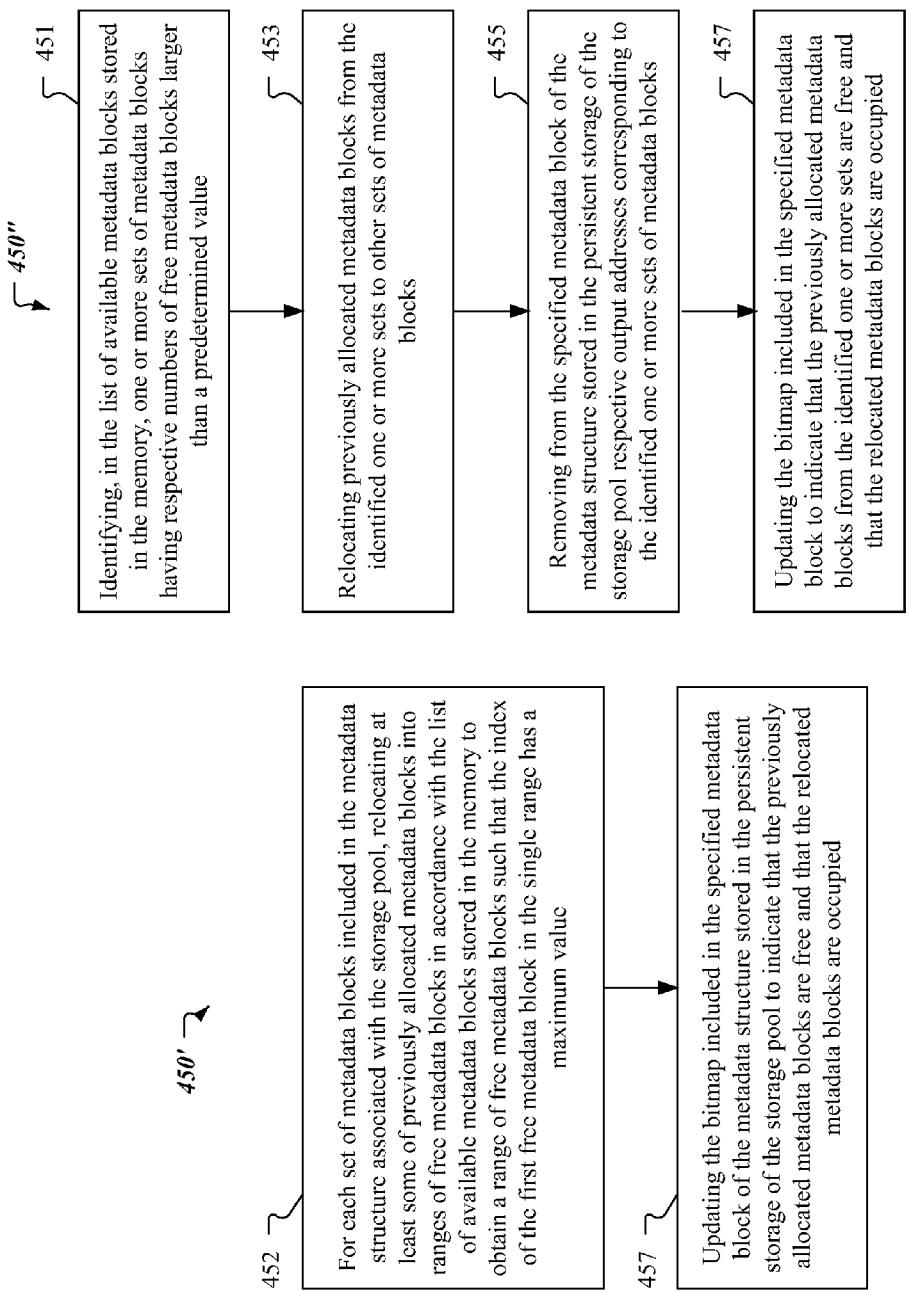

METADATA MANAGEMENT FOR POOLS OF STORAGE DISKS

CROSS REFERENCE TO RELATED APPLICATIONS

This application claims the benefit of the priority of U.S. Provisional Application Ser. No. 61/307,804, filed Feb. 24, 2010 and entitled "Persistent Metadata for Virtual Volumes". The content of this application is incorporated by reference in its entirety.

BACKGROUND

The present disclosure describes systems and techniques relating to metadata management for pools of storage disks.

A storage server system, such as a SAN (Storage Area Network) or NAS (Network-Attached Storage), has the primary purpose of providing shared storage that can be accessed by computers attached to the server through a network. A typical storage server is designed to serve as storage to many (10s or 100s or even 1000s) computers.

Modern storage servers provide virtualized storage to its users in the form of "virtual volumes". A virtual volume hides the way the physical storage is organized and presents a uniform, virtually contiguous storage to the outside world. In other words, what a computer attached to the storage server sees as a physically contiguous space is really composed of many physically disparate chunks of storage. The virtual volume concept provides flexibility to the storage server in order to serve as storage to many computers.

In order to provide the virtualized view to the outside world, the storage server maintains metadata that translates the virtualized storage to its physical counterpart. For example, for each virtual volume, the storage server can employ a tree structure, such as a B-Tree, to keep track of the metadata that translates from an address in the virtual volume to an address in that virtual volume's physical counterpart. The multiple physically disparate chunks of storage that can be included in the virtual volume's physical counterpart may be disks or disk partitions aggregated together as redundant array of inexpensive disks (RAID) devices. Such RAID devices can be exported as logical disks to users associated with the RAID devices.

Logical disks, which are managed using identical RAID properties, represent a pool of storage disks. For example, a storage pool can contain one or more logical disks that have identical RAID properties viz. RAID1/RAID0, numbers of stripe members, and the like. Notably, the storage pool can be expanded on a need basis by adding more disks (which are) aggregated into new logical disk(s) of the storage pool. Such storage pools can be used to allocate storage space to the virtual volumes. Adding storage on-demand in the fashion described above is referred to as virtual volume "provisioning".

SUMMARY

The present disclosure includes systems and techniques relating to metadata management for storage pools. An aspect of the subject matter described in this specification can be implemented in a system including a processor, a memory and a storage system. The storage system contains a storage pool including multiple storage devices. Also, the storage system is configured to store in persistent storage associated with the storage pool a data structure consisting of multiple bits that is configured to indicate whether metadata blocks corresponding to one or more virtual volumes associated with the storage pool are free or occupied. Each of the metadata blocks includes multiple output addresses corresponding to the storage pool, and the output addresses link a virtual volume from among the one or more virtual volumes to the storage pool. In addition, the processor is configured to perform operations including accessing at least portions of the data structure consisting of the multiple bits, and managing, based on information from the accessed portions, at least some of the metadata blocks stored in the persistent storage.

These and other implementations can include one or more of the following features. Accessing the data structure consisting of the multiple bits can include identifying, as part of initiating the storage pool and based on indications from the data structure consisting of the multiple bits, free metadata blocks from among the metadata blocks corresponding to the one or more virtual volumes associated with the storage pool. Additionally, managing at least some of the metadata blocks stored in the persistent storage can further include generating in the memory a list of available metadata blocks to include the identified free metadata blocks.

In some implementations, managing at least some of the metadata blocks stored in the persistent storage can further include serving requests for allocating metadata blocks to a virtual volume based on the generated list of available metadata blocks; updating the list of available metadata blocks to remove the allocated metadata blocks from the list of available metadata blocks; and updating the data structure consisting of the multiple bits to indicate that the allocated metadata blocks are occupied. Each of the metadata blocks corresponding to the one or more virtual volumes associated with the storage pool can further include a header, such that managing at least some of the metadata blocks stored in the persistent storage can further include writing in each of the allocated metadata blocks' headers an identifier of the virtual volume to which the metadata block has been allocated, and an index of the data structure consisting of the multiple bits.

In addition, the system can further include a metadata structure associated with the storage pool that is stored in the persistent storage associated with the storage pool. The metadata structure can include sets of the metadata blocks corresponding to the one or more virtual volumes associated with the storage pool. Each of the sets can have a predetermined number of data extents, where each of the data extents represents contiguous storage locations in a physical storage device from among the multiple storage devices. The metadata structure can further include a specified metadata block that includes (i) respective output addresses corresponding to the sets and (ii) the data structure consisting of multiple bits. In some implementations, the specified metadata block can be contained in a single data extent. In some implementations, the sets of the metadata blocks corresponding to the one or more virtual volumes associated with the storage pool and the specified metadata block can form a management hierarchy of no more than two levels.

Further, the list of available metadata blocks can include, for each of the sets of the metadata blocks corresponding to the one or more virtual volumes associated with the storage pool, information comprising a total number of free metadata blocks corresponding to the set, and one or more ranges of free metadata blocks within the set. Additionally, each range of free metadata blocks includes a set index of a first free metadata block in the range and the number of free metadata blocks in the range. In some implementations, managing at least some of the metadata blocks stored in the persistent storage can further include, for each of the sets, relocating previously allocated metadata blocks into ranges of free metadata blocks in accordance with the list of available metadata blocks to obtain a range of free metadata blocks such that the index of the first free metadata block in the obtained range has a maximum value; and updating the data structure consisting of the multiple bits to indicate that the previously allocated metadata blocks are free and that the relocated metadata blocks are occupied.

In some implementations, managing at least some of the metadata blocks stored in the persistent storage can further include identifying, in accordance with the list of available metadata blocks, one or more of the sets of the metadata blocks corresponding to the one or more virtual volumes associated with the storage pool having respective numbers of free metadata blocks larger than a predetermined value, and relocating previously allocated metadata blocks from the identified one or more of the sets to other of the sets. Further, managing at least some of the metadata blocks stored in the persistent storage can further include removing from the specified metadata block respective output addresses corresponding to the identified one or more of the sets; and updating the data structure consisting of the multiple bits to indicate that the previously allocated metadata blocks from the identified one or more of the sets are free and that the relocated metadata blocks are occupied.

Furthermore, the metadata structure associated with the storage pool can further include lists of virtual volume record blocks. Each of the virtual volume record blocks can include attributes of the respective virtual volume, and each of the lists can have one or more contiguous data extents corresponding to respective virtual volume record blocks associated with respective virtual volumes from among the one or more virtual volumes associated with the storage pool. The specified metadata block can further include (iii) respective output addresses corresponding to the lists of the virtual volume record blocks. In some implementations, managing at least some of the metadata blocks stored in the persistent storage can further include deleting a virtual volume from among the one or more virtual volumes associated with the storage pool. Moreover, each of the metadata blocks corresponding to the one or more virtual volumes associated with the storage pool can further include a header. As such, managing at least some of the metadata blocks stored in the persistent storage can further include, for each of the metadata blocks corresponding to the deleted virtual volume, obtaining from the metadata block's header an index of the data structure consisting of the multiple bits, and updating the data structure consisting of the multiple bits to indicate that the metadata block corresponding to the obtained index is free; removing the virtual volume record block associated with the deleted virtual volume from a corresponding list of virtual volume record blocks; and updating the list of available metadata blocks to append the metadata blocks corresponding to the deleted virtual volume to the list of available metadata blocks.

Methods representing functionality of the described system can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described. Thus, program implementations can be realized from a disclosed method, system, or apparatus and apparatus implementations can be realized from a disclosed system, computer-readable medium, or method.

Details of one or more implementations are set forth in the accompanying drawings and the description below. Other features, objects and advantages may be apparent from the description and drawings, and from the claims.

DRAWING DESCRIPTIONS

FIGS. 4A-4D show aspects of a process for managing metadata for virtual volumes and storage pools.

Like reference symbols in the various drawings indicate like elements.

DETAILED DESCRIPTION

The systems and techniques described herein can be implemented in one or more storage server systems, such as a SAN or NAS, in various storage environments (e.g., a storage system in an enterprise network). As used herein, a "virtual address space" is the contiguous storage space represented by a virtual volume, and a "data extent" is the unit in which space from the physical storage is allocated to virtual volumes. As such, storage space from a storage pool is allocated to virtual volumes in multiples of data extents. In general, a data extent is a physically contiguous chunk of data within a logical disk. In addition, the data extent can be a set of physically contiguous RAID stripes (if the underlying storage is available in terms of RAID).

Figure 1A:
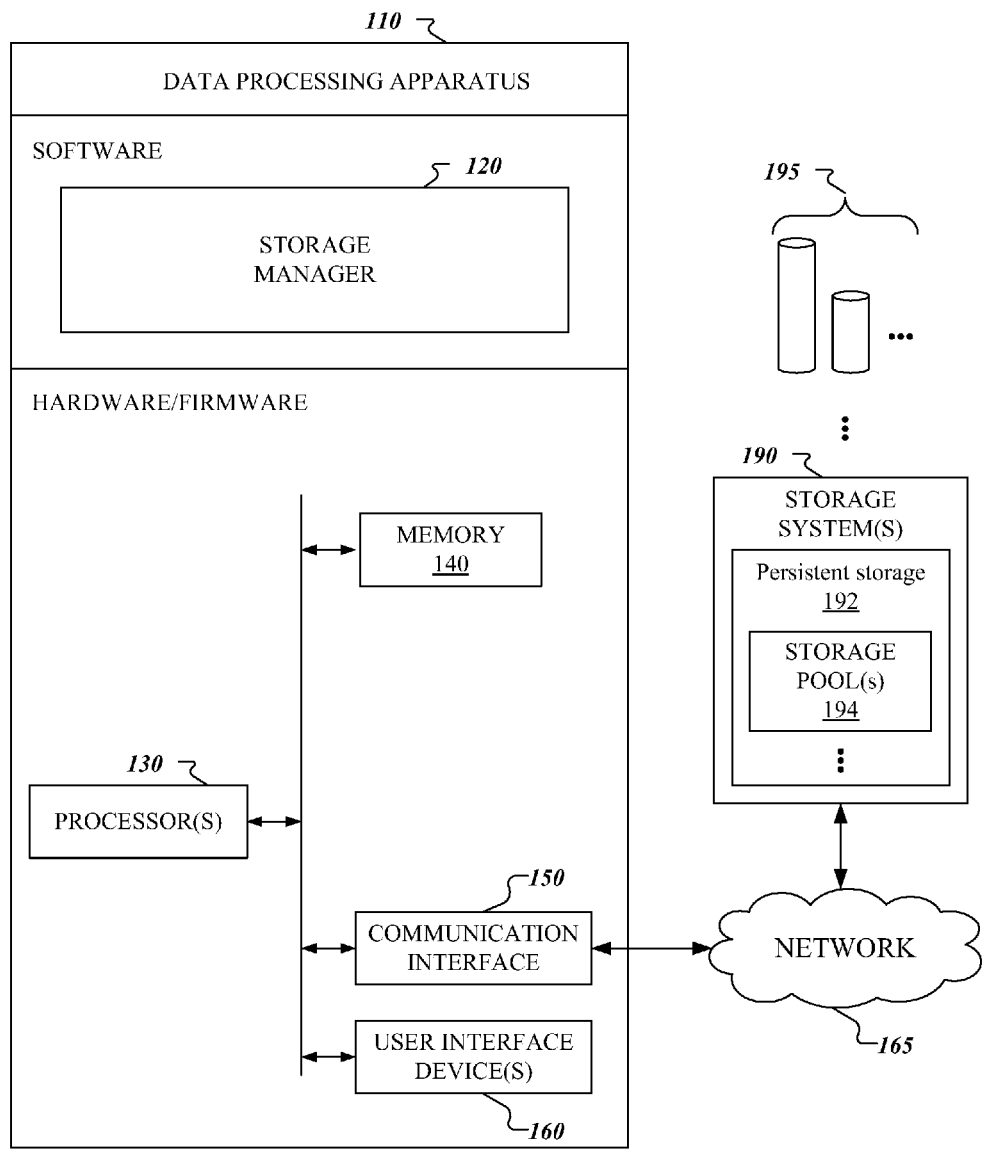
FIG. 1A shows an example of a system that manages metadata for virtual volumes and storage pools.

FIG. 1A shows an example of a system that manages metadata for virtual volumes. A data processing apparatus 110 includes hardware/firmware, which provides the hardware platform, and software that runs on this hardware platform. The data processing apparatus 110 includes one or more processors 130 and at least one computer-readable medium 140. The computer-readable medium 140 can include a memory 142, a persistent storage 144, or both. The memory 142 can be any form of volatile memory, such as Random Access Memory (RAM), which is used to store code and data for running programs. Volatile memory is a memory device that requires power to maintain its state, such that when power to the device is interrupted, any saved data is lost due to the nature of the memory device itself. In contrast, persistent storage 144 includes any storage device that is not dependent on supplied power to retain saved memory state, such as flash memory devices, magnetic disks (e.g., disks in an internal hard drive of the computer system), magneto optical disks (e.g., a re-writeable DVD-ROM disk), etc. The data processing apparatus 110 can also include a communication interface 150, and one or more user interface devices 160.

The communication interface 150 provides access to one or more storage systems 190 (e.g., a RAID system) over a data communication network 165 (e.g., an Enterprise network, the Internet, a Virtual Private Network). Access to the communication interface 150 can be provided to various programs through a network stack, an operating system of the apparatus 110, or a combination of these. The storage systems 190 contains persistent storage 192, i.e., storage devices that are not dependent on supplied power to retain saved memory state, such as flash memory devices, magnetic disks (e.g., disks in an internal hard drive of the computer system), magneto optical disks (e.g., a re-writeable DVD-ROM disk), etc. At least a portion of the persistent storage 192 of the storage system(s) 190 can be allocated to at least one storage pool 194.

The user interface device(s) 160 can include display screen(s), keyboard(s), mouse, stylus, other user input/output devices, or any combination thereof. Moreover, the data processing apparatus 110 can itself be considered a user interface device. Thus, the apparatus 110 represents multiple types of computing systems, including, for example, a personal computer running a storage manager program 120, a server computer or network device within a storage server system, or a dumb terminal through which the storage manager program 120 is remotely provided.

The storage manager 120 loads metadata for accessing virtual volumes 195 into the memory 142 from persistent storage, which can be the persistent storage 144 or persistent storage available in storage system(s) 192 (e.g., the metadata stored persistently in the same underlying RAID system to which the metadata maps virtual input addresses). Each of the virtual volumes 195 is presented as a contiguous storage space even though the storage space may be in fact divided among many physical storage devices, e.g., multiple different hard disks, multiple different RAID groups, etc. Physical space for the virtual volumes 195 can be allocated from the at least one storage pool 194 in the remote storage system(s) 190. For example, the virtual volumes 195 can be allocated physical space from a storage pool 194 formed from RAID groups assigned to that storage pool 194.

The virtual volumes 195 can be exported to the outside world (programs and users) in various manners, as is known in the art, such as through an application (e.g., an email server application) or an operating system resource (e.g., an "E:" drive in a WINDOWS® computer system). In order to provide a virtualized view to the outside world, the storage manager 120 maintains and manages metadata that translates the virtualized storage 195 to its physical counterpart 194. The metadata provides a mapping to convert input virtual addresses to output addresses that correspond to the physical storage system 194 (e.g., logical addresses in a RAID system). The metadata is persistent because it is always retained in persistent storage 144 or 192, so that the metadata is not lost in the event of a power failure or other unexpected shutdown.

The storage manager 120 can be a virtual volume/storage pool layer in a data storage system 190 that maintains a mapping between the virtual and the logical addresses for every virtual volume 195. The storage manager 120 can have counterpart software in the apparatus 110, such as only a web browser that interacts with the remote storage manager. The virtual volume persistent metadata provides a persistent mapping between virtual addresses and the corresponding logical addresses (e.g., in a RAID system) or physical addresses (e.g., to an actual disk drive). The virtual volume persistent metadata can be efficiently stored and managed, as described herein. Moreover, the virtual volumes 195 can be created as relatively small spaces and then be expanded later into larger spaces, as desired, and more physical storage devices can be added as needed. Furthermore, the system can readily support sparse virtual volumes 195, as detailed further below.

Figure 1B:
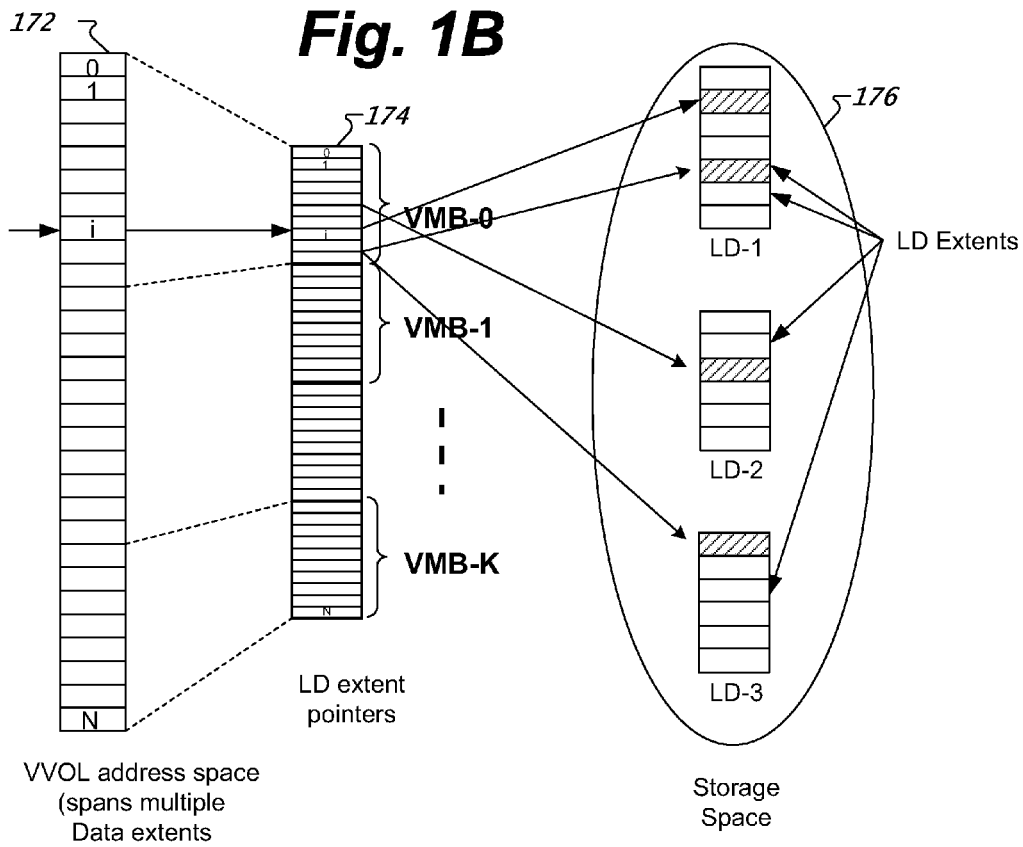
FIG. 1B shows an example of mapping a virtual volume address space to physical storage space.

FIG. 1B shows an example of mapping a virtual volume address space 172 to physical storage space 176. A virtual volume exports a virtually contiguous storage device that can be addressed using virtual addresses in the virtual volume address space 172. The virtual volume address space 172 spans multiple data extents, and the virtual volume can be addressed by a series of virtual blocks (0 . . . N−1) where N is the total number of (fixed-sized) blocks exported by the virtual volume. Moreover, the virtual volume persistent metadata for every virtual volume can be stored as a series of metadata blocks 174, also referred to interchangeably as virtual metadata blocks (VMB-0, VMB-1, [ . . . ] VMB-K).

As shown in FIG. 1B, the various data extents of the virtual volume can come from entirely different locations in a physical storage system (e.g., different logical disks (LD) in a RAID system as shown). A virtual address from the space 172 can be mapped to an output address (a pointer entry) in a specific VMB of the entire set of VMBs 174. This mapping can be readily performed using a mathematical formula as deterministic mapping. For example, the input can correspond to block offset→offset in Virtual Volume address space in terms of 4K blocks, and the output can correspond to a Virtual Metadata Block Number (VMBN) and an index of an extent pointer in a VMB. The system constraints can include: X=Number of extent pointers within a VMB (e.g., 500), and Y=Number of blocks within extent (e.g., a 1 megabyte (MB) extent can have 128 blocks of 4 kilobytes (KB) each). The VMBN can be found using the following formula: VMBN= [Block offset/(X*Y)], where the index of the extent within the VMB=(Block offset/Y) Modulo(X).

Each output address (or pointer) in a VMB (e.g., VMB-0 in FIG. 1B) corresponds to a specific data extent in the storage space 176. For example, multiple disks (or subdisks, where a subdisk is a fixed sized partition from within a disk) can be grouped to create a RAID device. The RAID device can be exported as a Logical Disk to its users. A logical disk can be addressed using Logical Addresses (LD_ID+LD_OFFSET=0 . . . M−1, where M is the total number of fixed sized blocks supported by the RAID device). Translation between logical addresses (LD_ID+LD_OFFSET) and physical addresses (DISK_ID+DISK_OFFSET) can be done using simple mathematics within the RAID system.

Thus, an output address from each VMB can be a physical address (e.g., DISK_ID+DISK_OFFSET) or a logical address (e.g., LD_ID+LD_OFFSET) for a data extent. The size of the data extents can be set as a system parameter by a system administrator (e.g., set to 1 megabyte, 16 megabytes, or 48 megabytes per data extent). Note that setting a smaller extent size generally increases flexibility (e.g., in setting virtual volume size), but also results in more scattered data in the physical storage system, which can impact data access performance.

Figure 1C:
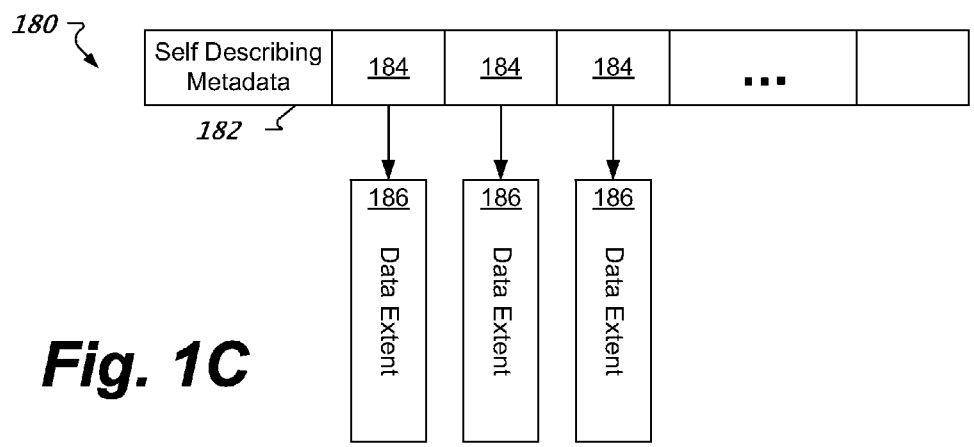
FIG. 1C shows an example of a virtual metadata block (VMB).

FIG. 1C shows an example of a VMB 180. Each VMB 180 can maintain a map of virtual input addresses to output addresses for a fixed (virtually contiguous) subset of a virtual volume. Each VMB 180 can consist of two entities: "self-describing metadata" (or meta-metadata of the metadata block) 182, and a series of persistent pointers 184. The meta-metadata 182 can include information sufficient to identify which virtual volume and which subset of the volume that the VMB 180 describes (e.g., a virtual volume identifier and a VMB number) and also an identifier corresponding to all the VMBs.

The meta-metadata 182 can be a predefined bit pattern that is included in all VMBs stored on disk for use in identifying the VMBs when reading them from disk. The predefined bit pattern should be sufficiently long (and possibly unique) to minimize the likelihood of the same bit pattern being present in regular data blocks. More than one copy of the predefined bit pattern can be included in each VMB (e.g., two copies of the bit pattern at disparate locations in the VMB on disk) to improve robustness in the event that one of the copies is somehow corrupted. Furthermore, the meta-metadata 182 can also contain data integrity fields (e.g., checksums) that add to the robustness of the persistent data, and various bookkeeping data fields (e.g., a software version number to assist in future backward compatibility support).

The series of pointers 184 can be a fixed number (e.g., five hundred) of pointers, which are output addresses corresponding to the mapped data extents 186 (e.g., each pointer can be LD_ID+LD_OFFSET). The output addresses can be logical addresses or physical addresses. Note that in the case of logical addresses, the logical address to physical address mapping need not be stored since it is a simple mathematical translation, which can be handled by the underlying RAID system.

Since each persistent pointer 184 describes the mapping for an entire extent, a relatively small sized VMB can describe a huge area of the virtual volume. For example, if the extent size is 1 MB, each persistent pointer takes up 8 bytes and a VMB has five hundred pointers, a single VMB of 4 KB can provide a mapping to 500 MB of virtual volume metadata. The remaining 96 KB within the VMB (1 MB extent size minus 4 KB for pointers, when each VMB is assigned to a single data extent) can be used for meta-metadata.

Note that each VMB 180 can be independent of other VMBs 180, which can improve the robustness of the system. There does not need to be any (persistent) tree or linked-list style structure that links the different VMBs for a virtual volume together when they are stored on disk. Each VMB 180 can be entirely self-contained with self-describing metadata. All VMBs 180 for a virtual volume can reside in close vicinity on persistent storage (e.g., on top of a well-protected RAID layer). Thus, upon boot-up of the storage server, all VMBs of a virtual volume can be efficiently read by doing a single, sequential read from the persistent storage to build up the in-core metadata structures that can then serve the data. The self-describing nature of the VMBs and the fact that they are not linked using complex data structures on disk, can make them very resilient for storing persistent metadata. This is, in part, because simpler structures are less vulnerable to data corruption in case of uncommon or bizarre scenarios.

Figure 2A:
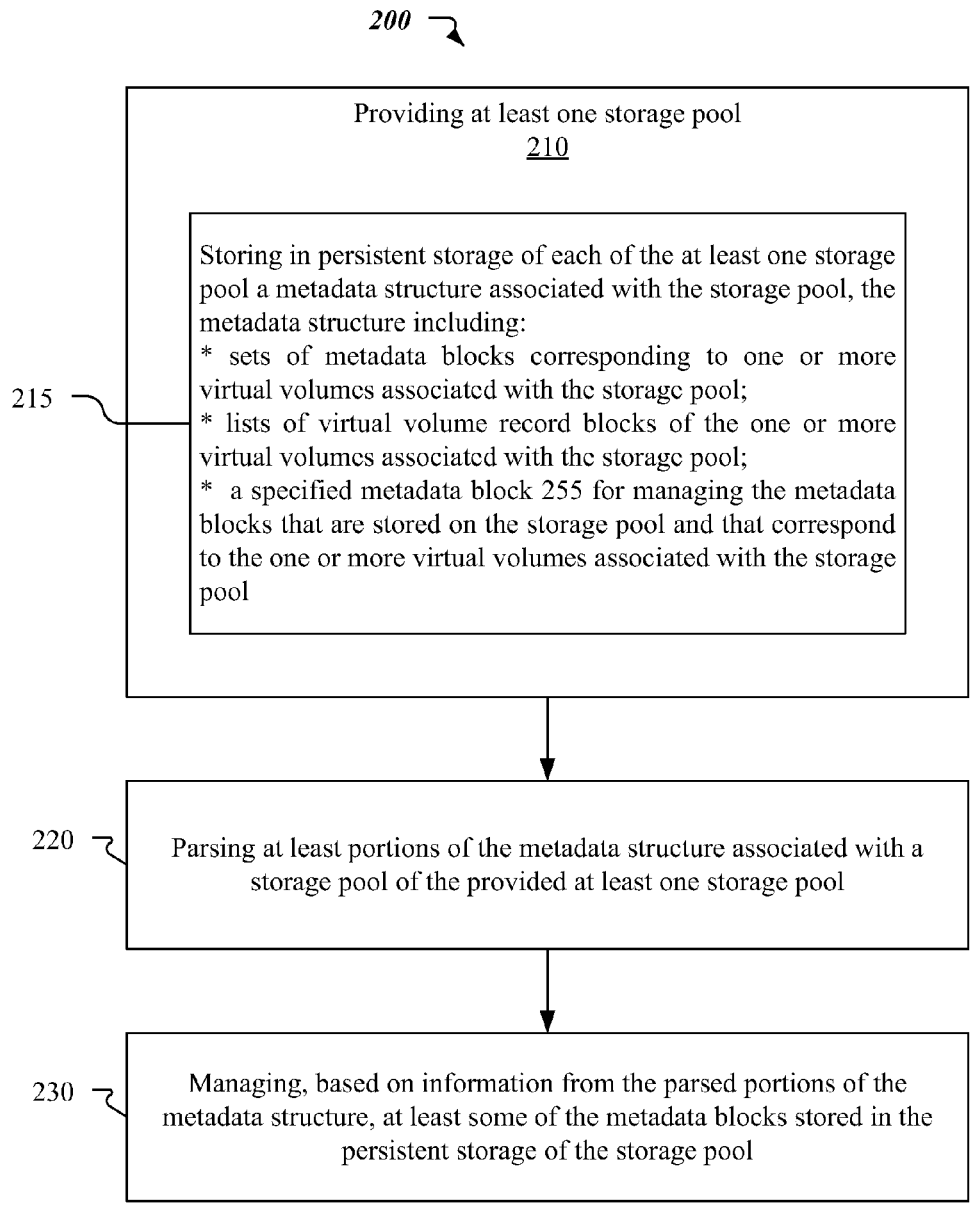
FIG. 2A shows an example of a process for managing metadata for a storage system.

FIG. 2A shows an example of a method 200 for managing metadata for a storage system. For example, method 200 can be used for on-demand allocation of virtual metadata blocks and superblocks during virtual volume creation (or provisioning.) In some implementations corresponding to the storage environment illustrated in FIG. 1A, virtual volumes 195 can be created and/or deleted on an as needed basis by the storage manager 120. This can be performed using on-demand allocations from the storage pool 194 for storing not only data extents of the virtual volumes 195, but also for storing virtual metadata blocks and superblocks of the virtual volumes 195.

For thin provisioned volumes, the virtual metadata blocks may have to be allocated at any point during the lifetime of the volume based on when the particular range of the volume gets provisioned. Thin provisioned volumes are virtual volumes 195 for which storage space is provisioned in small chunks (e.g., 1 MB data extents). These volumes 195 can usually be grown through specified administrative commands and provide managing flexibility, since the volumes 195 can be created small, but can be grown arbitrarily any number of times in small chunks. Method 200 can be used to create sparse, on-demand, thin provisioned virtual volumes 195.

On-demand thin provisioned volumes are thin provisioned volumes 195 for which no space is provisioned at creation time. Storage space for such volumes 195 is provisioned automatically (on-demand) when the volume is written to. Since the volume is thin provisioned, only a small chunk (depending on the thin provision size) of space is provisioned corresponding to the area of the volume that is accessed. Sparse volumes are on-demand, thin provisioned virtual volumes 195 for which a large percentage of storage space has not been provisioned. Also, most sparse volumes 195 have one or more hot spots (one or more scattered sections of this thin volume that are read/written repeatedly) while a majority of the volume is never accessed. Thus, sparse volumes 195 often generate common locality in the metadata being accessed. Method 200 can be implemented to manage the space allocated to thin provisioned volumes 195 from the storage pool 194 (which is in terms of data extents) and to carve out virtual metadata blocks or superblocks to be consumed by the thin provisioned virtual volumes 195.

Figure 2B:
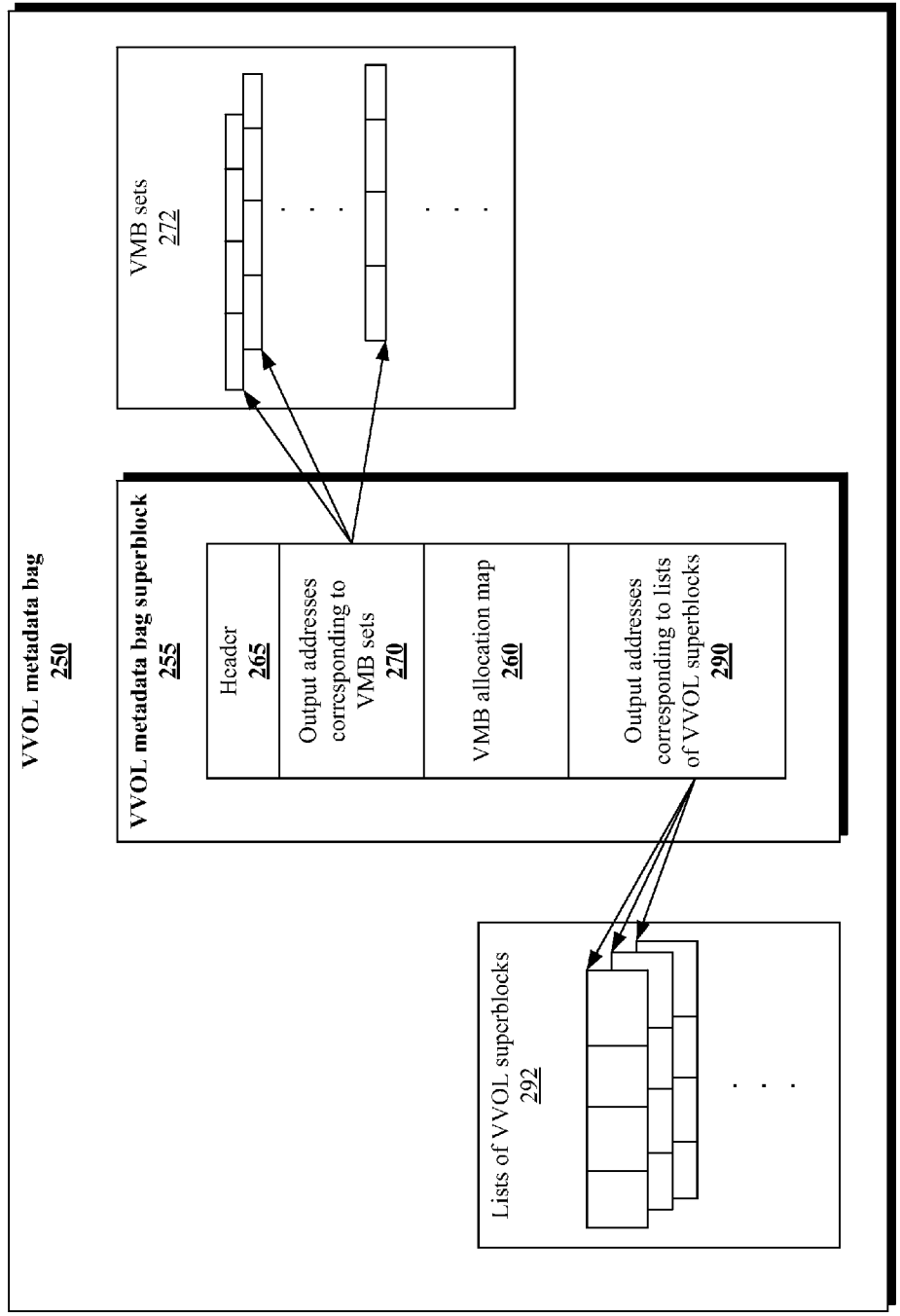
FIGS. 2B-2D show aspects of an example of a metadata structure that is stored in persistent storage and is associated with the storage pool.
Figure 2C:
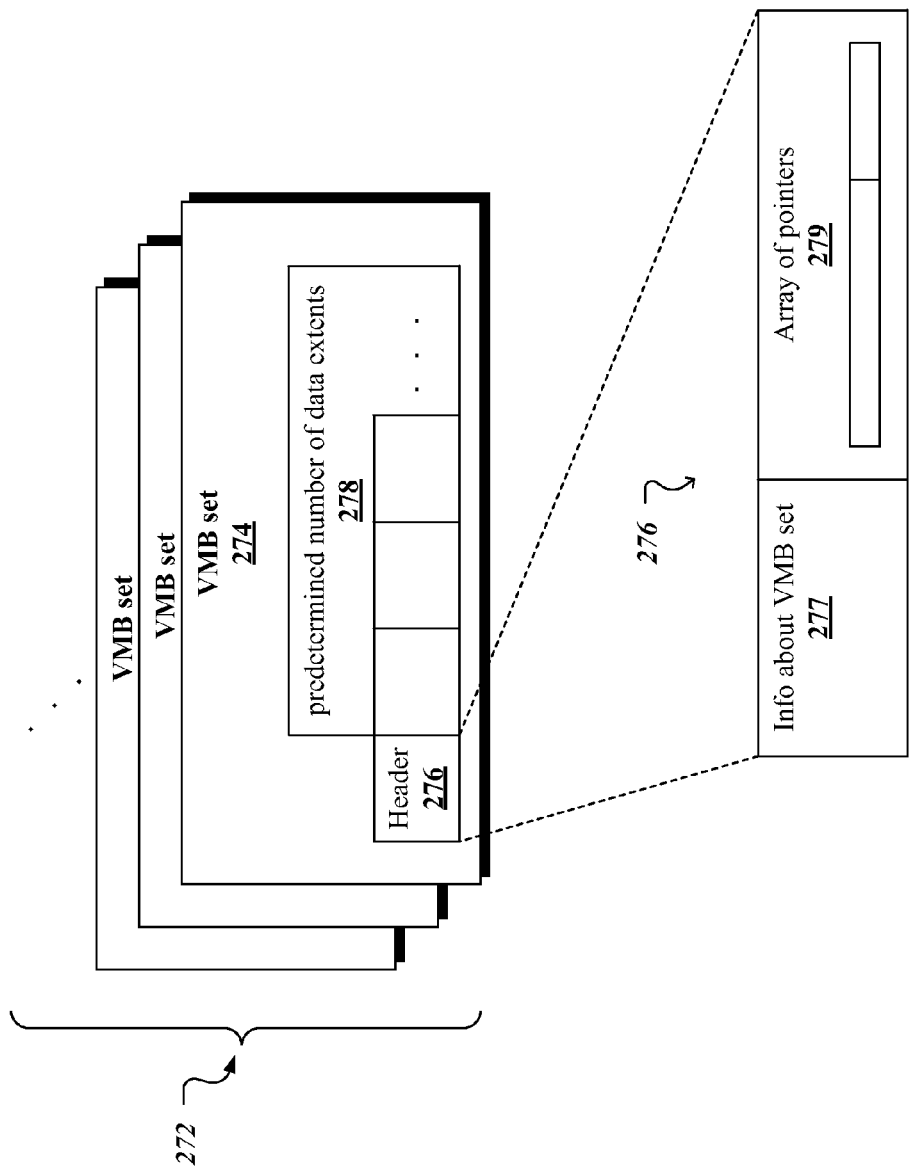
Figure 2D:
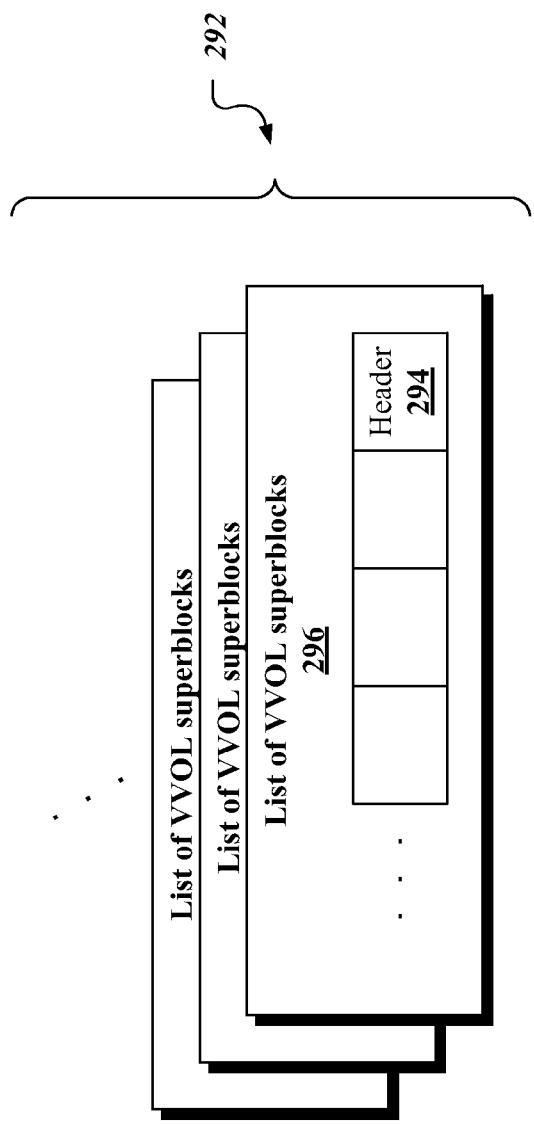

At 210, a storage pool including multiple storage devices is provided. As described above in connection with FIG. 1A, the multiple storage devices provided as part of the storage pool 194 can be configured as a redundant array of inexpensive disks (RAID) devices. At 215, the provided storage pool 194 is configured to store in persistent storage 192 associated with the storage pool 194 a metadata structure associated with the storage pool 194. An example of a metadata structure 250 associated with a storage pool 194 is shown in FIGS. 2B-2D. The metadata structure 250 associated with the storage pool 194 can be referred to, interchangeably, as a virtual volume metadata bag or metadata bag in short. The metadata bag 250 can be considered the meta-metadata which holds information about the persistent metadata corresponding to the one or more virtual volumes 195, i.e., about the multiple metadata blocks and the virtual volume record blocks (or superblocks) corresponding to the one or more virtual volumes 195. One metadata bag 250 is maintained per storage pool. As described in detail below in connection with FIGS. 4A-4D, information in the metadata bag 250 can be used for allocating space from the storage pool 194 (in terms of data extents) and can be used for managing this space from the storage pool 194 to serve allocations/deletions for the multiple metadata blocks and superblocks corresponding to the one or more virtual volumes 195 which use the storage pool. Objects included in the metadata bag 250 are described in detail below.

As shown in FIG. 2B, the metadata bag 250 includes sets 272 of metadata blocks stored by the storage pool. Each metadata block VMB-i, where i=0, . . . , k, is independent from the others, i.e., a metadata block VMB-i is not directly linked, e.g., through pointers, or the like, to any other metadata blocks VMB-j, j≠i. Further in accordance with the description provided in connection with FIGS. 1B-1C, each metadata block 180 includes multiple output addresses corresponding to the physical storage space 176 for linking a virtual volume address space 172—corresponding to the one or more virtual volumes 195 associated with the storage pool 194—to which the metadata block 180 corresponds to the storage pool 194. For example, a metadata block 180 can be a fixed size block (e.g., 8K) carved out of a data extent 186 (having a size of 1 Mb) and maintains a virtual address-logical address mapping for a fixed (virtually contiguous) subset of a virtual volume address space 172. Each metadata block 180 can include a series of persistent pointers 184 (virtual address-logical address mappings). Each persistent pointer 184 describes a translation (or mapping) of a virtual address to its logical address equivalent for a data extent 186 (contiguous chunk of blocks). A metadata block 180 also can have a header section 182 which includes information (such as checksums) that enable error detection and recovery, etc., as described in detail above in connection with FIG. 1C. Moreover, the metadata blocks corresponding to thin provisioned volumes can be also allocated on demand, i.e., as and when the metadata blocks of the volume get allocated (provisioned).

FIG. 2C shows sets 272 of metadata blocks stored by the storage pool. Each of the sets 272 of metadata blocks is independent from any other of the sets 272 of metadata blocks, i.e., the set 274 of metadata blocks is not directly linked, e.g., through pointers, or the like, to any other of the sets 272 of metadata blocks. The metadata set 274 is used to serve storage space for metadata blocks stored by the storage pool with which the metadata bag 250 is associated. Additionally, each metadata set 274 can have a predetermined number of contiguous data extents 278, where each of the data extents is a contiguous set of storage locations in a physical storage device from among the multiple storage devices. For example, the metadata set 274 can have 32 contiguous data extents. At least one data extent of the set 274 of metadata blocks includes an associated number (or an associated subset) of metadata blocks from among metadata blocks associated with the set 274 of metadata blocks.

Also, each of the sets 272 of metadata blocks has a data extent from among the predetermined number of data extents that includes a set header 276. The set header 276 can include information 277 specific to the set 274 of metadata blocks including checksums, a VMB identifier, which can be a predefined bit pattern that is included in all VMBs stored on disk for use in identifying the VMBs when reading them from disk, version number, etc., corresponding to the set 274 of metadata blocks. In some implementations, the set header 276 can include respective output addresses corresponding to the predetermined number of data extents 278. For example, the set header 276 can include space for storing an additional array of pointers 279. The pointers 279 can be used to build the metadata set 274 over multiple scattered data extents. This may be useful in cases where the storage pool is fragmented and cannot provide contiguous data extents for allocation of the metadata set 274.

For example, assuming a data extent size of 1 MB, 32 data extents associated with a set 274 of metadata blocks can hold 4096 VMBs (where the VMB size is 8K). When the set header 276 uses 8K, a single VMB Set 274 can serve allocation for 4095 VMBs. In this fashion, the information stored in the metadata bag 250 can be used for mapping ~2 GB of storage space of the storage pool.

FIG. 2D shows lists 292 of virtual volume record blocks. A virtual volume record block can be referred to, interchangeably, as a virtual volume superblock. Virtual volume attributes/characteristics included in the virtual volume's superblock can completely and uniquely characterize the virtual volume. Among the virtual volume characteristics included in the virtual volume superblock can be the volume's name, size, type (data volume/snapshot,) and the like. The virtual volume superblock is allocated at the time of virtual volume's creation.

Each list having one or more contiguous data extents 296 corresponding to respective virtual volume superblocks associated with respective virtual volumes from among the one or more virtual volumes 195 associated with the storage pool. These superblock lists 292 can be used to allocate address space for virtual volume superblocks. Each of the lists 292 of virtual volume superblocks includes a list header 294 including an allocation map (e.g., a bitmap) of the virtual volume superblocks 296 in the list of virtual volume superblocks. The list header 294 can further include additional miscellaneous information like checksums, a list identifier, etc. The list identifier can be used to identify superblock lists 292 in a similar manner that a VMB identifier is used to identify virtual metadata blocks in a virtual volume. For example, the VMB identifier is "123" and the superblock list is "987".

Referring again to FIG. 2B, the metadata bag 250 further includes a specified metadata block 255 including respective output addresses 270 corresponding to the sets 272 of metadata blocks, a data structure 260 consisting of multiple bits configured to indicate whether the multiple metadata blocks included in the sets 272 of metadata blocks are free or occupied, and respective output addresses 290 corresponding to the lists 292 of virtual volume superblocks. The specified metadata block 255 can be referred to, interchangeably, as the metadata bag superblock, or the bag superblock in short. As described below, information in the metadata bag superblock 255 can be used to manage metadata blocks—from among the sets 272 of metadata blocks that are stored on the storage pool—and that correspond to the one or more virtual volumes 195 associated with the storage pool.

In most cases, the bag superblock 255 can be contained in a single data extent. Additionally, the output addresses 270 corresponding to the sets 272 of metadata blocks can be stored in the bag superblock 255 as pointers to the respective metadata sets 272, for instance. Similarly, the output addresses 290 corresponding to the lists 292 of virtual volume superblocks can be stored in the bag superblock 255 as pointers to the respective virtual volume superblock lists 292.

The data structure 260 consisting of the multiple bits can be implemented, for example, as a bitmap and can be referred to interchangeably as the VMB bitmap. The VMB bitmap 260 can be configured as a rectangular M×N matrix having a number "M" of rows equal to the number of metadata sets 272, and a number "N" of columns equal to maximum number of metadata blocks in a set 274 of metadata blocks (e.g., 4095 VMBs.) Accordingly, a bit-value of 0 corresponding to index (i,j) of the VMB bitmap 260 can mean that the $j^{th}$ metadata block of the $i^{th}$ set 274 of metadata blocks is free for future allocation. Alternatively, a bit-value of 1 corresponding to the index (i,j) of the VMB bitmap 260 can mean that the $j^{th}$ metadata block of the $i^{th}$ set 274 of metadata blocks is occupied, i.e., this VMB has been pre-allocated to a virtual volume; therefore it is unavailable for future allocation to any of the one or more virtual volumes 195. Additionally, the VMB map 260's index (i,j), also referred to interchangeably as the VMB key (i,j), can be written in the header of the $j^{th}$ metadata block of the $i^{th}$ set 274 of metadata blocks, as described in detail below in connection with FIG. 4A.

The bag superblock 255 further includes a header 265. The bag superblock header 265 can include a checksum, a bag superblock identifier, and other various bookkeeping data fields corresponding to the metadata bag 250. The bag superblock identifier can be used to identify bag superblocks 255 in a similar manner that a VMB identifier is used to identify virtual metadata blocks in a virtual volume. For example, the VMB identifier is "123" for all VMBs of the virtual volume and the superblock is identified by number "576", for instance.

In view of the above description, the metadata bag 250 including the metadata blocks of the sets 272 of metadata blocks and the bag superblock 255 forms a management hierarchy. For example, the metadata bag 250 associated with the storage pool 294 can have a flat management hierarchy including first and second hierarchical levels. The first hierarchical level of the metadata bag 250's management hierarchy contains the sets 272 of VMBs and the bag superblock 255. A second hierarchical level of the metadata bag 250's management hierarchy contains the VMBs of the sets 272, such that each of the VMBs from among the sets 272 of VMBs is mapped (indexed) in the VMB allocation bitmap 260 of the bag superblock 255. In this manner, the forgoing mapping (indexing) constitutes (provides) the connection between the first and second management hierarchies of the metadata bag 250.

Referring again to FIG. 2A, at 220, at least portions of the metadata structure 250 associated with the storage pool 194 are accessed. For example, the data structure 260 consisting of the multiple bits can be scanned to identify free metadata blocks 180 to fill an allocation request for a virtual volume associated with the storage pool. Other examples of accessing at least portions of the metadata structure 250 are described below in connection with FIGS. 3A and 4A-4D.

At 230, at least some of the multiple metadata blocks stored in the persistent storage of the storage pool are managed based on information from the accessed portions of the metadata structure 250. Managing the multiple metadata blocks in accordance with the information stored persistently in the metadata structure 250 can include, among other things, allocation and deletion of metadata blocks corresponding to the one or more virtual volumes 195 associated with the storage pool, de-fragmentation of the physical storage available to the storage pool, and the like.

For example, the VMB sets 272 can be pre-allocated at the time of creation of the storage pool using information from the metadata structure 250. So, any future VMB allocation requests during volume provisioning (or during volume creation) can be served from these pre-allocated VMB sets 272. This not only makes future allocations faster (since a trip to the storage pool can be avoided during allocation of every VMB), it also reduces fragmentation of the storage pool. Using the pre-allocated VMB sets 272 stored in the metadata structure 250 also simplifies the metadata scheme/environment of the storage pool since the storage manager 120 can serve allocations for only fixed size objects (i.e. data extents.)

Additionally, the VMB sets 272 can be allocated by the storage manager 120 in the background when the number of free VMBs falls below a predefined threshold. The background processing can reduce the latency of VMB allocations at run time.

Also, not all VMB 272 sets need to be allocated at the time the virtual volume is created; instead allocation of VMB sets 272 can be done based on thresholds (as disclosed above) thereby alleviating the need to provision all the metadata space beforehand. For example, a thin provisioned volume is a type of virtual volume where the physical space allocated to the volume at creation time is less than the size that the volume may reach at times later than the creation time. Actual space is allocated for a metadata block 180 (or range of metadata blocks 174) in response to a first write request to the particular metadata block 180 (or range of metadata blocks 174) in question. Moreover, the allocation of M metadata blocks (where M=size of data extent/size of a virtual metadata block 180) can be performed in a single operation because the virtual volume is configured to obtain address space from the storage pool in multiples of data extents (i.e., at least one data extent is obtained from the storage pool for the allocation of the M metadata blocks) and because only one on-disk data structure, the VMB bitmap 260 of the metadata bag 250, need be updated for the allocation of the M metadata blocks. Thus metadata block (VMB) allocation based on information from the metadata structure 250 can be advantageous in thin provisioning (on-demand allocation) of the virtual volume metadata space (VMB space) without potentially impacting the latency of VMB allocations.

In addition, metadata blocks VMB-0, VMB-1, . . . , VMB-k corresponding to different volumes of the at least one virtual volume 195 can be interspersed in VMB sets 272 (as the metadata blocks of one are not linked with the others). Accordingly, during bring up (bootstrap) of the storage stack (pool,) each of the VMB sets 272 can be read in one go. This results in bring up of all virtual volumes associated with the storage pool in parallel. Also, since a VMB set 274 can be stored in contiguous data extents, reads of the VMB sets 272 can be performed efficiently. The fact that VMB sets 272 are not linked with each other can be leveraged to read all the allocated VMB sets 272 in parallel (by multiple processor threads) and not sequentially (by one processor thread,) thereby further accelerating the bring up (bootstrap) process of the storage stack.

Moreover, the method 200 and the information stored in the metadata structure 250 can provide flexibility in choosing the protection level for the metadata corresponding to a storage pool. For example, the storage manager 120 can select the metadata structure 250 during creation of a virtual volume. The storage manager 120 can create virtual volumes 195 from a storage pool with lower protection level (e.g., corresponding RAID0) but can use a metadata structure 250 from another, different storage pool (e.g., corresponding to RAID5).

Figure 3A:
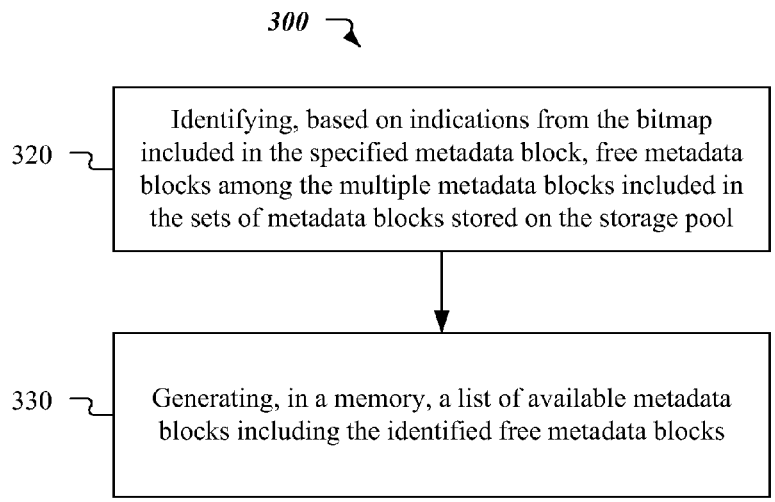
FIG. 3A shows an example of a process for generating in memory a list of available metadata blocks.

FIG. 3A shows an example of a method 300 for generating in memory a list of available metadata blocks stored in persistent storage of a storage pool. In the example illustrated in FIG. 1A, the method 300 can be performed by the processor 130 of the data processing apparatus 110 and can be implemented as part of the storage manager 120. Moreover, method 300 can be used in conjunction with method 200 for managing at least some of the metadata blocks stored in the persistent storage 192 of the storage pool 194.

The method 300 can be combined with method 200 for accessing at least portions of the metadata structure 250 stored on persistent storage of the storage stack. At 320, free metadata blocks among the multiple metadata blocks included in the sets of metadata blocks 272 stored on the storage pool 194 can be identified based on indications from the data structure 260 consisting of the multiple bits included in the specified metadata block 255. For example, the foregoing identifying can be carried out during the boot-up process of the storage pool 194.

The method 300 can be further combined with method 200 for managing at least some of the metadata blocks stored in the persistent storage 192 of the storage pool 194. At 330, a list of available metadata blocks including the identified free metadata blocks can be generated in a memory 142 communicatively coupled with the data processor 130.

For instance, during bring up of a storage stack (i.e., of software used to manage on-disk aspects of the storage system 190, e.g., the storage pool 194 and the virtual volume 195) the data structure 260 in the specified metadata block 255 stored in the persistent storage 192 can be scanned and an in-core (i.e. in-memory) scatter-gather-list (sgl) can be generated to include metadata blocks indicated as free in the data structure 260. Free metadata blocks can be appended to the sgl when new VMB sets 272 are provisioned or when virtual volumes 195 are deleted. For example, allocation of a new VMB set 274 adds one VMB set entry in the sgl. As another example, multiple deletions of one or more virtual volumes 195 can result in addition of multiple entries in the sgl (which may lead, in some instances, to fragmentation of the on-disk VMB sets 272.) However, deletion of a virtual volume is typically an infrequent operation on storage systems 190, hence fragmentation of the VMB sets 272 due to virtual volume deletions may be a rare occurrence, and the length of individual VMB Sets in the sgl is expected to be short.

Figure 3B:
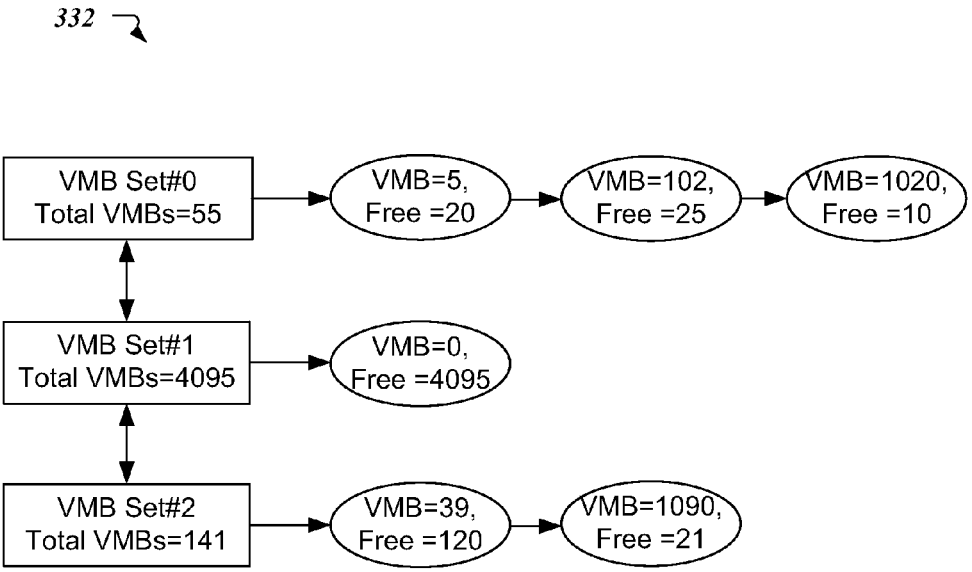
FIG. 3B shows an example of the list of available metadata blocks that is stored in memory.

FIG. 3B shows an example of a list 332 of available metadata blocks that can be stored in memory. The list 332 of available metadata blocks, also referred to, interchangeably, as a scatter-gather list (sgl), can be generated in the memory 142 of the processor 110 in accordance with methods 200 and 300, for instance. As described above in connection with FIG. 3A, the list 332 of available metadata blocks is generated based on information gathered from the data structure 260.

The list 332 of available metadata blocks can include, for each of the sets 272 of metadata blocks, VMB (where j=0, 1, 2, . . . ,) information including a total number of free metadata blocks within the VMB set "j". Additionally for each VMB set "j", the information can also contain one or more ranges of free metadata blocks within the VMB set "j". A range of free metadata blocks can be defined as a pair of numbers: The first number is a set-index (e.g., between 0 and 4095, for a VMB set including 4096 metadata sets,) of a first free metadata block in the range, and the second number is the number of free metadata blocks in the range.

For the example illustrated in FIG. 3B, the information associated with the VMB set "0" includes a total number of 55 free VMBs, distributed over three ranges of the VMB set "0", the first range starting with the $5^{th}$ VMB and having 20 consecutive free VMBs (over the set-indexes 5, 6, . . . , 24,) the second range starting with the $102^{nd}$ VMB and having 25 consecutive free VMBs (over the set-indexes 102, 103, . . . , 123,) and the third range starting with the $1020^{th}$ VMB and having 10 consecutive free VMBs (over the set-indexes 1020, 1021, . . . , 1019.) The sum of the three ranges of VMBs is equal to 55=20+25+10.

Also for the example illustrated in FIG. 3B, the information associated with the VMB set "1" includes a total number of 4095 free VMBs, distributed over one range starting with the $0^{th}$ VMB and having 4095 consecutive free VMBs (over the set-indexes 0, 1, . . . , 4095.) In fact, all the metadata blocks of the VMB set "1" are free and available for allocation for provisioning of virtual volumes associated with the instant storage pool.

And once again for example illustrated in FIG. 3B, the information associated with the VMB set "2" includes a total number of 141 free VMBs, distributed over two ranges of the VMB set "2", the first range starting with the $39^{th}$ VMB and having 120 consecutive free VMBs (over the set-indexes 39, 40, . . . , 158,) and the second range starting with the $1090^{th}$ VMB and having 21 consecutive free VMBs (over the set-indexes 1090, 1091, . . . , 1110.) The sum of the three ranges of VMBs is equal to 141=120+21.

FIGS. 4A-4D show examples of methods for managing metadata for virtual volumes and storage pools. In the example illustrated in FIG. 1A, the methods shown in FIGS. 4A-4D can be performed by the processor 130 of the data processing apparatus 110 and can be implemented as part of the storage manager 120.

Figure 4A:
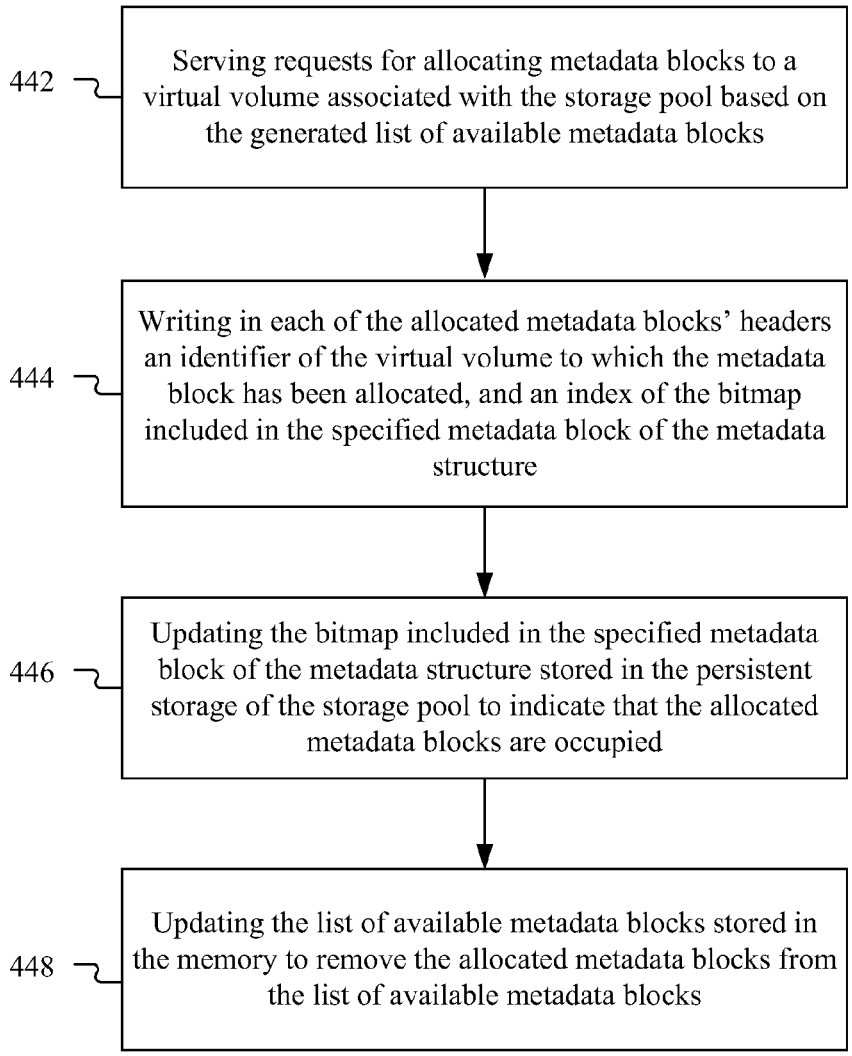

FIG. 4A shows an example of a method 440 for allocating metadata blocks to one or more virtual volumes 195. Method 440 can be combined with the method 300 for performing the allocations of the metadata blocks stored in the persistent storage 192 of the storage pool 194. For example, the storage manager 120 can look up the in-core list 332 of available metadata blocks to determine a requested number of free VMBs. The method 440 can be further combined with method 200 for managing the at least some of the metadata blocks stored in the persistent storage 192 of the storage pool 194. At 442, requests for allocating metadata blocks to a virtual volume associated with the storage pool can be served based on the generated list 332 of available metadata blocks.

At 444, an identifier of the virtual volume to which the metadata block has been allocated, and an index of the data structure 260 consisting of the multiple bits can be written in each of the allocated metadata blocks' headers 182, after serving the requests for allocating metadata blocks to the virtual volume. Accordingly, the VMB header 182 includes at least a virtual volume identifier and the index in the data structure 260 (also known as the VMB index.) As described above in connection with FIG. 2B, the VMB index contains the index of the VMB set 274 and an in-set index (ranging from 0-4095.)

At 446, the data structure 260 can be updated to indicate that the allocated metadata blocks are occupied. For example, after a VMB (or range of VMBs) is allocated from the list 332 of available metadata blocks stored in the memory 142, the data structure 260 (in the specified metadata block 255) stored in persistent storage can be updated to reflect the newly allocated VMBs by switching the corresponding bits in the data structure 260.

At 448, the list 332 of available metadata blocks stored in the memory 142 can be updated to remove the allocated metadata blocks from the list 332 of available metadata blocks. For example, after serving the allocation request for a VMB (or range of VMBs) from the list 332 of available metadata blocks, the latter can be reduced to drop the allocated VMBs so they are not used for further allocations.

FIG. 4B shows an example of a method 450' that can be combined with methods 200 and 300 for managing the sets of metadata blocks stored in persistent storage of the storage pool to defragment the storage pool.

At 452, for each set 274 of metadata blocks included in the metadata structure 250 associated with the storage pool, previously allocated metadata blocks can be relocated into ranges of free metadata blocks, in accordance with the list 332 of available metadata blocks stored in the memory 142, to obtain a range of free metadata blocks such that the index of the first free metadata block in the obtained range has a maximum value. For example, the list 332 of available metadata blocks, depicted in FIG. 3B, indicates 55 free (unoccupied) VMBs for VMB set "0" distributed over three ranges of free VMBs (5, 20), (102, 25) and (1020, 10,)—expressed in terms of (range offset, range length). The storage manager 120 can relocate 55 occupied VMBs starting from the $4041^{st}$ VMB to the $4095^{th}$ (last) VMB in the VMB set "0" to the initially free ranges (5, 20), (102, 25) and (1020, 10.) After the relocation, VMB set "0" includes one single range of free VMBs (4041, 55.)

At 457, the data structure 260 consisting of the multiple bits can be updated to indicate that the previously allocated metadata blocks are free and that the relocated metadata blocks are occupied.

Because the VMBs (within each of the VMB Sets 272) share no link with each other, and also because the VMB Sets 272 are independent of each other, de-fragmentation of portions of the storage pool in accordance with method 450' can be performed by copying allocated VMBs in the holes created in VMB Sets 272 and updating the data structure 260 accordingly. Moreover, the effectiveness of the de-fragmenting method 450' can be improved by occupying the low index portions of the VMB Sets 271 (i.e., in-set indexes closer to 0 that to 4095,) and leaving empty the high index portions of the VMB Sets 271 (i.e., in-set indexes closer to 4095 that to 0,) as described in the above example.

FIG. 4C shows another example of a method 450" that can be combined with methods 200 and 300 for managing the sets of metadata blocks stored in persistent storage of the storage pool to defragment the storage pool.

At 451, one or more sets of metadata blocks having respective numbers of free metadata blocks larger than a predetermined value can be identified in the list 332 of available metadata blocks stored in the memory 142. For example, the list 332 of available metadata blocks can indicate that a first set of metadata blocks has 4085 free metadata blocks, and that a second set of metadata blocks has 450 free metadata blocks. This is equivalent to ten occupied (allocated) metadata blocks associated with the first set of metadata blocks and 3645 occupied (allocated) metadata blocks associated with the second set of metadata blocks. If the predetermined value of free metadata blocks is 4045, the storage manager 120 implementing method 450" can identify the first set of metadata blocks as having a number of free metadata blocks (4085) that exceeds the predetermined value (4045.)

At 453, the previously allocated metadata blocks from the identified one or more sets can be relocated to other sets of metadata blocks. Referring to the above example, the storage manager 120 relocates ten previously allocated metadata blocks from the identified first set of metadata blocks to the second set of metadata blocks, which initially has 450 free metadata blocks. After the relocating, the first set of metadata blocks has 4095 free metadata blocks (i.e., no block is occupied in the first set of metadata blocks,) while the second set of metadata blocks has 440 free metadata blocks.

At 455, respective output addresses 270 corresponding to the identified one or more sets of metadata blocks can be removed from the specified metadata block 255 of the metadata structure 250 stored in the persistent storage of the storage pool. Referring again to the above example, the storage manager 120 removes from the specified metadata block 255 the pointer to the first set of metadata blocks (from among the pointers 270 to the sets 272 of metadata blocks.) Optionally, the storage manager 120 can release the storage space previously occupied by the first set of metadata blocks (32 Mb=32 extents×1 Mb) back to the storage pool.

At 457, the bitmap included in the specified metadata block can be updated to indicate that the previously allocated metadata blocks from the identified one or more sets are free and that the relocated metadata blocks are occupied. Note that the methods 450' and 450" for defragmenting the storage pool can be performed without having to modify any complex tree-like data structures.

Figure 4D:
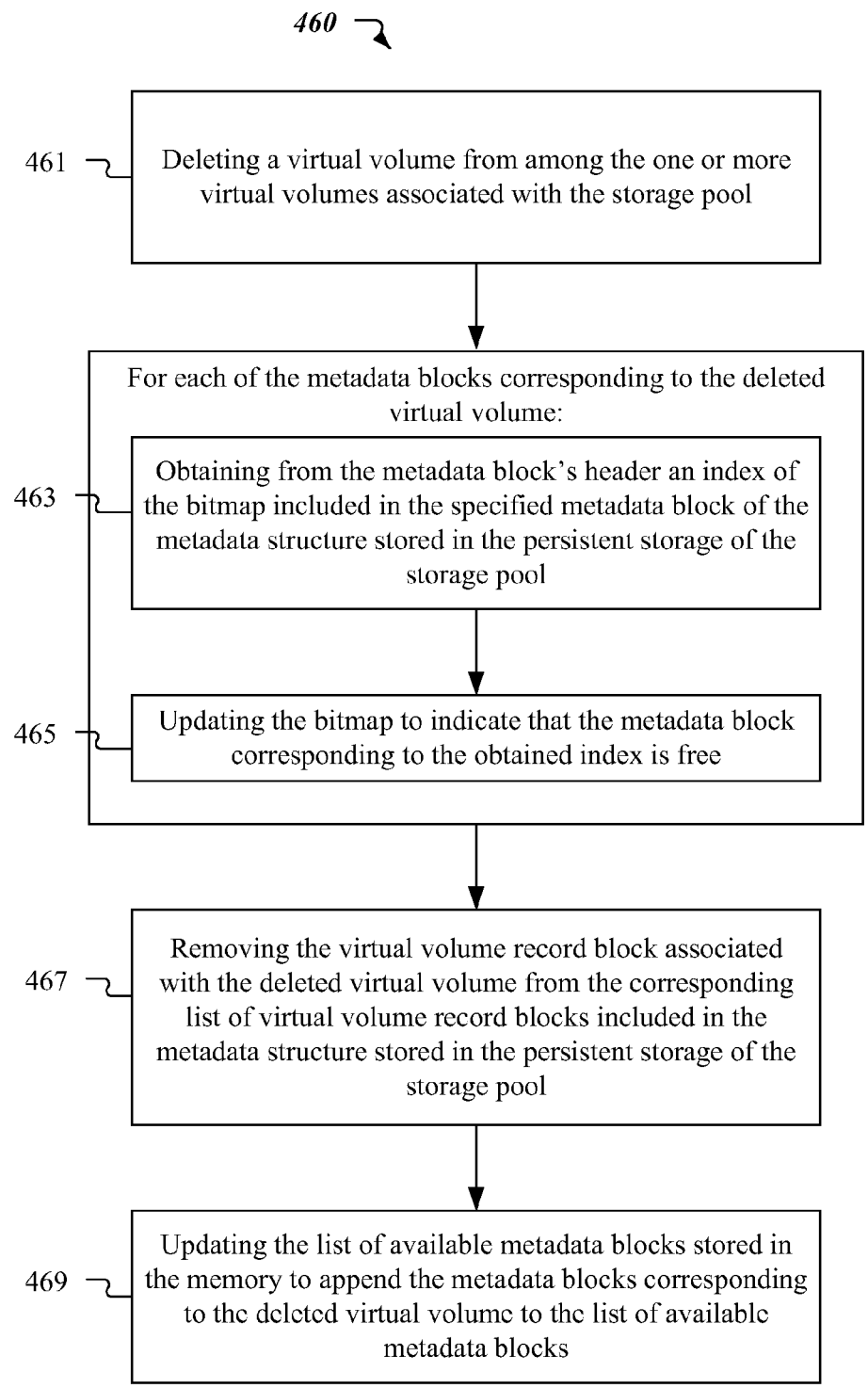

FIG. 4D shows an example of a method 460 for deleting virtual volumes 195. Method 460 can be combined with the method 200 for managing at least some of the metadata blocks stored in the persistent storage 192 of the storage pool 194. At 461, a virtual volume from among the one or more virtual volumes 195 associated with the storage pool can be deleted. For example, a particular virtual volume having 4291 associated VMBs can be deleted by the storage manager 120. The 4291 VMBs associated with the particular virtual volume can be identified by searching for the particular virtual volume's ID stored in the respective headers 182 of the 4291 VMBs associated with the particular virtual volume. Deleting the particular virtual volume can include removing the particular virtual volume ID from the respective headers of the 4291 associated VMBs.

At 463, for each of the metadata blocks corresponding to the deleted virtual volume, an index of the data structure 260 consisting of the multiple bits can be obtained from the metadata block's header 182. The obtained index can be used to update a corresponding entry of the data structure 260 and the list 332 of available metadata blocks that is stored in memory 142. Referring to the above example, the obtained VMB indexes correspond to 50 VMBs in VMB set "0", 4095 VMBs in VMB set "1" and 141 VMB's in set "2".

At 465, for each of the metadata blocks corresponding to the deleted virtual volume, the data structure 260 can be updated to indicate that the metadata block corresponding to the obtained index is free. Referring again to the above example, the bit-value corresponding to the obtained VMB indexes corresponding to 50 VMBs in VMB set "0", 4095 VMBs in VMB set "1" and 141 VMB's in set "2" are switched from "occupied" to "free".

At 467, the virtual volume superblock associated with the deleted virtual volume can be removed from the corresponding list of virtual volume superblocks included in the metadata structure 250 stored in the persistent storage 292 of the storage pool. Referring to the above example, the particular index corresponding to the deleted virtual volume is used to locate the superblock of the particular virtual volume in one of the virtual volume superblock lists 292 and to remove the deleted virtual volume's superblock from persistent storage.

At 469, the list 332 of available metadata blocks stored in the memory 142 can be updated to append the metadata blocks corresponding to the deleted virtual volume to the list 332 of available metadata blocks. Referring once again to the above example, FIG. 3B depicts a portion of the updated list 332 of available metadata blocks to reflect the deletion of the particular virtual volume and the corresponding gain of the 4291 VMBs that were associated with the deleted virtual volume.

Note that the method 460 for deleting a virtual volume associated with the storage pool can be performed without having to modify any complex tree-like data structures.

The described systems and techniques can result in a more robust storage system. For example, the metadata for a virtual volume can be stored in independent data blocks that each contain information that identifies which virtual volume and which subset of the volume that the data block describes, and information (such as checksums) that enable error detection and recovery. In addition, rather than storing a complex data structure on disk, each metadata block can include an identifier corresponding to the metadata blocks, which can be used to identify the metadata block during a sequential read from (and scan of) the persistent storage. This approach to reading virtual metadata from persistent storage can result in reduced seek time penalties.

Metadata block sets can be pre-allocated at the time of creation of the storage pool. Any further metadata block allocation requests during volume provisioning (or during volume creation) can be served from these metadata block sets. This can not only make the allocations faster (since a trip to the storage pool can be avoided during allocation of every metadata block), it can also reduce fragmentation of the storage pool. Further, this can simplify the metadata architecture of the storage pool since it needs to serve allocations for only fixed size objects (i.e., data extents.)

Metadata block sets can be allocated in the background if the number of free metadata blocks falls below a predefined threshold. This can reduce the latency of metadata block allocations at run time. Also, not all metadata block sets need to be allocated at the time when the volume is created, instead allocation of metadata block sets can be done based on storage thresholds, thereby alleviating the need to provision all the metadata space beforehand. Since, the virtual volume receives space in terms of data extents from the storage pool, allocation from blocks can be performed in a single operation. Thus the disclosed systems and methods can be used in thin provisioning (on-demand allocation) of the virtual volume metadata block space without significantly impacting the latency of metadata block allocations.

The systems and techniques disclosed in this specification can be used for simplified metadata block allocations to virtual volumes. For instance, the in-core availability list provides a required number of free metadata blocks for allocation to the virtual volume, and the metadata block allocation bitmap (in the metadata bag) provides a persistent record of the allocated and free metadata blocks.

The disclosed systems and techniques can be used for simplified virtual volume deletions. Upon deletion of a virtual volume, the metadata blocks associated with the virtual volume can be handed over sequentially to the metadata bag. The metadata block index (stored in the metadata block header) can be used to reset the corresponding bit in the metadata block allocation map. The range of metadata blocks that is freed by the virtual volume deletion can be appended to the in-core availability list. Accordingly, no complex data structures need to be modified on-disk to allocate/delete a metadata block. The provisioning and deleting of virtual volumes does not require modification of complex trees/data structures.

Further, the systems and techniques disclosed in this specification can be used for fast bootstrapping of the storage pool. Since metadata blocks of different volumes are interspersed in metadata block sets (and the latter are not linked with each other), during initiation of the storage stack the entire metadata block sets can be read in a single, sequential read from storage. This results in bring up of all virtual volumes associated with the storage stack in parallel. Also, since a metadata block set is stored in contiguous data extents the reads can be efficient. The fact that metadata block sets are not linked with each other can be further leveraged to read all the allocated metadata block sets in parallel (and need not be done one after other) thereby further accelerating the bring up process.

Furthermore, the disclosed systems and techniques can be used for providing flexibility in choosing the protection level for metadata. Storage system administrators can be given an option to choose a metadata bag during creation of virtual volume. For example, if a virtual volume is created from a storage pool with lower protection level (e.g., RAID0) the protection level for the metadata can be selected to be higher, for example, by using a metadata bag from another storage pool (e.g., RAID5).

In addition, the systems and techniques disclosed in this specification can be used for simplified de-fragmentation. By virtue of the fact that metadata blocks (inside the metadata block sets) do not share any link with each other and also the metadata block sets are not dependent on each other, de-fragmentation can be implemented by copying allocated metadata blocks in free data ranges created in metadata block sets and by updating the metadata block allocation bitmap accordingly.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims. For example, the disclosed techniques and systems can be used to manage databases or file systems. More specifically, indexing of database or file system based on the flat management hierarchies described in this specification can be implemented more efficiently than B+tree hierarchies that are used to manage indexing of most databases or file systems.

As another example, the techniques and systems disclosed in this specification can be used in a distributed storage environment. In such case, the disclosed metadata management structure (e.g., as described in connection with FIGS. 2B-2D) can be used to manage storage space across multiple storage systems associated with the distributed storage environment, and/or the disclosed processing (e.g., as described in connection with FIGS. 3A-3B and 4A-4D) can be carried out on multiple computing systems associated with the distributed storage environment.

What is claimed is:

1. A system comprising:
a processor;
a memory coupled with the processor; and
a storage system coupled with the processor, the storage system comprising a storage pool including multiple storage devices, the storage system configured to store in persistent storage associated with the storage pool a bitmap that is configured to indicate whether metadata blocks corresponding to one or more virtual volumes associated with the storage pool are free or occupied, each of the metadata blocks including multiple output addresses corresponding to the storage pool, the output addresses linking a virtual volume from among the one or more virtual volumes to the storage pool,
wherein the processor is configured to perform operations comprising
accessing at least portions of the bitmap, and
managing, based on information from the accessed portions, at least some of the metadata blocks stored in the persistent storage,
wherein said accessing comprises identifying, as part of initiating the storage pool and based on indications from the bitmap, free metadata blocks from among the metadata blocks corresponding to the one or more virtual volumes associated with the storage pool,
wherein said managing comprises generating in the memory a list of available metadata blocks to include the identified free metadata blocks,
wherein the system further comprises a metadata structure associated with the storage pool and stored in the persistent storage associated with the storage pool, the metadata structure including:
sets of the metadata blocks corresponding to the one or more virtual volumes associated with the storage pool, each of the sets having a predetermined number of data extents, each of the data extents representing contiguous storage locations in a physical storage device from among the multiple storage devices, and
a specified metadata block including (i) respective output addresses corresponding to the sets and (ii) the bitmap,
wherein the list of available metadata blocks includes, for each of the sets of the metadata blocks corresponding to the one or more virtual volumes associated with the storage pool,
information comprising a total number of free metadata blocks corresponding to the set, and
one or more ranges of free metadata blocks within the set, each range of free metadata blocks comprising a set index of a first free metadata block in the range and the number of free metadata blocks in the range, and
wherein said managing further includes
for each of the sets, relocating previously allocated metadata blocks into ranges of free metadata blocks in accordance with the list of available metadata blocks to obtain a range of free metadata blocks such that the index of the first free metadata block in the obtained range has a maximum value, and
updating the bitmap to indicate that the previously allocated metadata blocks are free and that the relocated metadata blocks are occupied.

2. The system of claim 1, wherein:
said managing further includes
serving requests for allocating metadata blocks to a virtual volume based on the generated list of available metadata blocks,
updating the list of available metadata blocks to remove the allocated metadata blocks from the list of available metadata blocks, and
updating the bitmap to indicate that the allocated metadata blocks are occupied, and
wherein each of the metadata blocks corresponding to the one or more virtual volumes associated with the storage pool further includes a header, said managing further including writing in each of the allocated metadata blocks' headers
an identifier of the virtual volume to which the metadata block has been allocated, and
an index of the bitmap.

3. The system of claim 1, wherein the specified metadata block is contained in a single data extent.

4. The system of claim 1, wherein the sets of the metadata blocks corresponding to the one or more virtual volumes associated with the storage pool and the specified metadata block form a management hierarchy of no more than two levels.

5. A system comprising:
a processor;
a memory coupled with the processor; and
a storage system coupled with the processor, the storage system comprising a storage pool including multiple storage devices, the storage system configured to store in persistent storage associated with the storage pool a bitmap that is configured to indicate whether metadata blocks corresponding to one or more virtual volumes associated with the storage pool are free or occupied, each of the metadata blocks including multiple output addresses corresponding to the storage pool, the output addresses linking a virtual volume from among the one or more virtual volumes to the storage pool,
wherein the processor is configured to perform operations comprising
accessing at least portions of the bitmap, and
managing, based on information from the accessed portions, at least some of the metadata blocks stored in the persistent storage,
wherein said accessing comprises identifying, as part of initiating the storage pool and based on indications from the bitmap, free metadata blocks from among the metadata blocks corresponding to the one or more virtual volumes associated with the storage pool,
wherein said managing comprises generating in the memory a list of available metadata blocks to include the identified free metadata blocks,
wherein the system further comprises a metadata structure associated with the storage pool and stored in the persistent storage associated with the storage pool, the metadata structure including:
sets of the metadata blocks corresponding to the one or more virtual volumes associated with the storage pool, each of the sets having a predetermined number of data extents, each of the data extents representing contiguous storage locations in a physical storage device from among the multiple storage devices, and
a specified metadata block including (i) respective output addresses corresponding to the sets and (ii) the bitmap, and
wherein said managing further includes:
identifying, in accordance with the list of available metadata blocks, one or more of the sets of the metadata blocks corresponding to the one or more virtual volumes associated with the storage pool having respective numbers of free metadata blocks larger than a predetermined value;

relocating previously allocated metadata blocks from the identified one or more of the sets to other of the sets;

removing from the specified metadata block respective output addresses corresponding to the identified one or more of the sets; and updating the bitmap to indicate that the previously allocated metadata blocks from the identified one or more of the sets are free and that the relocated metadata blocks are occupied.

6. The system of claim 5, wherein the specified metadata block is contained in a single data extent.

7. The system of claim 5, wherein the sets of the metadata blocks corresponding to the one or more virtual volumes associated with the storage pool and the specified metadata block form a management hierarchy of no more than two levels.

8. A system comprising:
a processor;
a memory coupled with the processor; and
a storage system coupled with the processor, the storage system comprising a storage pool including multiple storage devices, the storage system configured to store in persistent storage associated with the storage pool a bitmap that is configured to indicate whether metadata blocks corresponding to one or more virtual volumes associated with the storage pool are free or occupied, each of the metadata blocks including multiple output addresses corresponding to the storage pool, the output addresses linking a virtual volume from among the one or more virtual volumes to the storage pool,
wherein the processor is configured to perform operations comprising
accessing at least portions of the bitmap, and
managing, based on information from the accessed portions, at least some of the metadata blocks stored in the persistent storage,
wherein said accessing comprises identifying, as part of initiating the storage pool and based on indications from the bitmap, free metadata blocks from among the metadata blocks corresponding to the one or more virtual volumes associated with the storage pool,
wherein said managing comprises generating in the memory a list of available metadata blocks to include the identified free metadata blocks,
wherein the system further comprises a metadata structure associated with the storage pool and stored in the persistent storage associated with the storage pool, the metadata structure including:
sets of the metadata blocks corresponding to the one or more virtual volumes associated with the storage pool, each of the sets having a predetermined number of data extents, each of the data extents representing contiguous storage locations in a physical storage device from among the multiple storage devices, and
a specified metadata block including (i) respective output addresses corresponding to the sets and (ii) the bitmap,
wherein the metadata structure associated with the storage pool further includes lists of virtual volume record blocks, each of the virtual volume record blocks including attributes of the respective virtual volume, each of the lists having one or more contiguous data extents corresponding to respective virtual volume record blocks associated with respective virtual volumes from among the one or more virtual volumes associated with the storage pool, and wherein the specified metadata block further includes (iii) respective output addresses corresponding to the lists of the virtual volume record blocks, and wherein said managing further includes
deleting a virtual volume from among the one or more virtual volumes associated with the storage pool,
wherein each of the metadata blocks corresponding to the one or more virtual volumes associated with the storage pool further includes a header, said managing further including for each of the metadata blocks corresponding to the deleted virtual volume
obtaining from the metadata block's header an index of the bitmap, and
updating the bitmap to indicate that the metadata block corresponding to the obtained index is free,
removing the virtual volume record block associated with the deleted virtual volume from a corresponding list of virtual volume record blocks, and
updating the list of available metadata blocks to append the metadata blocks corresponding to the deleted virtual volume to the list of available metadata blocks.

9. The system of claim 8, wherein the specified metadata block is contained in a single data extent.

10. The system of claim 8, wherein the sets of the metadata blocks corresponding to the one or more virtual volumes associated with the storage pool and the specified metadata block form a management hierarchy of no more than two levels.

11. A method comprising:
providing a storage pool including multiple storage devices, the storage pool being configured to store in persistent storage associated with the storage pool a bitmap that is configured to indicate whether metadata blocks corresponding to one or more virtual volumes associated with the storage pool are free or occupied, each of the metadata blocks including multiple output addresses corresponding to the storage pool, the output addresses linking a virtual volume from among the one or more virtual volumes to the storage pool;
accessing, by a data processor, at least portions of the bitmap; and
managing, by the data processor based on information from the accessed portions, at least some of the metadata blocks stored in the persistent storage,
wherein said accessing comprises identifying, as part of initiating the storage pool and based on indications from the bitmap, free metadata blocks from among the metadata blocks corresponding to the one or more virtual volumes associated with the storage pool,
wherein said managing comprises generating in memory a list of available metadata blocks to include the identified free metadata blocks,
wherein the method further comprises storing in the persistent storage associated with the storage pool a metadata structure associated with the storage pool, the metadata structure including
sets of the metadata blocks corresponding to the one or more virtual volumes associated with the storage pool, each of the sets having a predetermined number of data extents, each of the data extents representing contiguous storage locations in a physical storage device from among the multiple storage devices, and
a specified metadata block including (i) respective output addresses corresponding to the sets and (ii) the bitmap, wherein the list of available metadata blocks includes, for each of the sets of the metadata blocks corresponding to the one or more virtual volumes associated with the storage pool, information comprising a total number of free metadata blocks corresponding to the set, and one or more ranges of free metadata blocks within the set, each range of free metadata blocks comprising a set index of a first free metadata block in the range and the number of free metadata blocks in the range, and wherein said managing further includes for each of the sets, relocating previously allocated metadata blocks into ranges of free metadata blocks in accordance with the list of available metadata blocks to obtain a range of free metadata blocks such that the index of the first free metadata block in the obtained range has a maximum value, and updating the bitmap to indicate that the previously allocated metadata blocks are free and that the relocated metadata blocks are occupied.

12. The method of claim 11, wherein:
said managing further includes
serving requests for allocating metadata blocks to a virtual volume based on the generated list of available metadata blocks, updating the list of available metadata blocks to remove the allocated metadata blocks from the list of available metadata blocks, and updating the bitmap to indicate that the allocated metadata blocks are occupied, and wherein each of the metadata blocks corresponding to the one or more virtual volumes associated with the storage pool further includes a header, said managing further including writing in each of the allocated metadata blocks' headers an identifier of the virtual volume to which the metadata block has been allocated, and an index of the bitmap.

13. The method of claim 11, wherein the specified metadata block is contained in a single data extent.

14. The method of claim 11, wherein the sets of the metadata blocks corresponding to the one or more virtual volumes associated with the storage pool and the specified metadata block form a management hierarchy of no more than two levels.

15. A method comprising:
providing a storage pool including multiple storage devices, the storage pool being configured to store in persistent storage associated with the storage pool a bitmap that is configured to indicate whether metadata blocks corresponding to one or more virtual volumes associated with the storage pool are free or occupied, each of the metadata blocks including multiple output addresses corresponding to the storage pool, the output addresses linking a virtual volume from among the one or more virtual volumes to the storage pool;

accessing, by a data processor, at least portions of the bitmap; and managing, by the data processor based on information from the accessed portions, at least some of the metadata blocks stored in the persistent storage, wherein said accessing comprises identifying, as part of initiating the storage pool and based on indications from the bitmap, free metadata blocks from among the metadata blocks corresponding to the one or more virtual volumes associated with the storage pool, wherein said managing comprises generating in memory a list of available metadata blocks to include the identified free metadata blocks, wherein the method further comprises storing in the persistent storage associated with the storage pool a metadata structure associated with the storage pool, the metadata structure including sets of the metadata blocks corresponding to the one or more virtual volumes associated with the storage pool, each of the sets having a predetermined number of data extents, each of the data extents representing contiguous storage locations in a physical storage device from among the multiple storage devices, and a specified metadata block including (i) respective output addresses corresponding to the sets and (ii) the bitmap, and wherein said managing further includes:
identifying, in accordance with the list of available metadata blocks, one or more of the sets of the metadata blocks corresponding to the one or more virtual volumes associated with the storage pool having respective numbers of free metadata blocks larger than a predetermined value;

relocating previously allocated metadata blocks from the identified one or more of the sets to other of the sets;

removing from the specified metadata block respective output addresses corresponding to the identified one or more of the sets; and updating the bitmap to indicate that the previously allocated metadata blocks from the identified one or more of the sets are free and that the relocated metadata blocks are occupied.

16. The method of claim 15, wherein the specified metadata block is contained in a single data extent.

17. The method of claim 15, wherein the sets of the metadata blocks corresponding to the one or more virtual volumes associated with the storage pool and the specified metadata block form a management hierarchy of no more than two levels.

18. A method comprising:
providing a storage pool including multiple storage devices, the storage pool being configured to store in persistent storage associated with the storage pool a bitmap that is configured to indicate whether metadata blocks corresponding to one or more virtual volumes associated with the storage pool are free or occupied, each of the metadata blocks including multiple output addresses corresponding to the storage pool, the output addresses linking a virtual volume from among the one or more virtual volumes to the storage pool;

accessing, by a data processor, at least portions of the bitmap; and managing, by the data processor based on information from the accessed portions, at least some of the metadata blocks stored in the persistent storage, wherein said accessing comprises identifying, as part of initiating the storage pool and based on indications from the bitmap, free metadata blocks from among the metadata blocks corresponding to the one or more virtual volumes associated with the storage pool, wherein said managing comprises generating in memory a list of available metadata blocks to include the identified free metadata blocks, wherein the method further comprises storing in the persistent storage associated with the storage pool a metadata structure associated with the storage pool, the metadata structure including
- sets of the metadata blocks corresponding to the one or more virtual volumes associated with the storage pool, each of the sets having a predetermined number of data extents, each of the data extents representing contiguous storage locations in a physical storage device from among the multiple storage devices, and
- a specified metadata block including (i) respective output addresses corresponding to the sets and (ii) the bitmap, wherein the metadata structure associated with the storage pool further includes lists of virtual volume record blocks, each of the virtual volume record blocks including attributes of the respective virtual volume, each of the lists having one or more contiguous data extents corresponding to respective virtual volume record blocks associated with respective virtual volumes from among the one or more virtual volumes associated with the storage pool, and wherein the specified metadata block further includes (iii) respective output addresses corresponding to the lists of the virtual volume record blocks; and wherein said managing further includes
- deleting a virtual volume from among the one or more virtual volumes associated with the storage pool,
- wherein each of the metadata blocks corresponding to the one or more virtual volumes associated with the storage pool further includes a header, said managing further including for each of the metadata blocks corresponding to the deleted virtual volume
  - obtaining from the metadata block's header an index of the bitmap, and
  - updating the bitmap to indicate that the metadata block corresponding to the obtained index is free,
- removing the virtual volume record block associated with the deleted virtual volume from a corresponding list of virtual volume record blocks, and
- updating the list of available metadata blocks to append the metadata blocks corresponding to the deleted virtual volume to the list of available metadata blocks.

19. The method of claim 18, wherein the specified metadata block is contained in a single data extent.

20. The method of claim 18, wherein the sets of the metadata blocks corresponding to the one or more virtual volumes associated with the storage pool and the specified metadata block form a management hierarchy of no more than two levels.

\* \* \* \* \*